United States Patent [19]

Schäfer

[11] 4,233,190
[45] Nov. 11, 1980

[54] PROCESS FOR THE PRODUCTION OF CARBON DIOXIDE ABSORPTION AGENT PELLETS FOR USE IN RESPIRATORY EQUIPMENT

[75] Inventor: Jürgen Schäfer, Frankfurt, Fed. Rep. of Germany

[73] Assignee: Drägerwerk Aktiengesellschaft, Fed. Rep. of Germany

[21] Appl. No.: 58,241

[22] Filed: Jul. 17, 1979

Related U.S. Application Data

[62] Division of Ser. No. 892,038, Mar. 31, 1978.

[30] Foreign Application Priority Data

Apr. 7, 1977 [DE] Fed. Rep. of Germany ....... 2715635

[51] Int. Cl.$^3$ .............................................. B01J 23/02
[52] U.S. Cl. ................................................... 252/475
[58] Field of Search .......................... 252/475; 423/640; 128/142 R, 191 R

[56] References Cited

U.S. PATENT DOCUMENTS

| | | | |
|---|---|---|---|
| 2,147,191 | 2/1939 | Carson | 423/640 |
| 2,784,062 | 3/1957 | Locke et al. | 423/640 |
| 2,894,820 | 7/1959 | Rikard et al. | 423/640 |
| 3,511,600 | 5/1970 | Kim | 423/640 |

FOREIGN PATENT DOCUMENTS

| | | | |
|---|---|---|---|
| 591314 | 8/1947 | United Kingdom | 252/475 |
| 317630 | 12/1971 | U.S.S.R. | 423/640 |

*Primary Examiner*—W. J. Shine
*Attorney, Agent, or Firm*—McGlew and Tuttle

[57] ABSTRACT

A process for the production of carbon dioxide absorption agent pellets for respiration equipment is carried out using a moving conveyor having a surface with shaped depressions therein and finely ground lime is continuously added with water as it is moved through a slaking zone to slake the lime and subsequently the slaked lime is continuously kneaded as it is moved through a moving zone to form a pasty mass, the pasty mass being pressed into the shaped depressions of the conveyor, and thereafter drying the material in the shaped depressions to form carbon dioxide absorption pellets, and subsequently ejecting the pellets from the depressions.

The reaction temperature of the mass maintained in the slaking zone is over 60° C., and in the kneading zone it is maintained below 80° C. The process is characterized by the use of electric conductivity of the mass to regulate the mass throughput, and the viscosity is used as a measurement to regulate the quantity of water which is added to slake the lime. The apparatus for carrying out the process includes a twin screw conveyor having a proportioning section and a slaking section and a kneading section, with temperature controls for the slaking and kneading section, and which discharges to a knifing device which applies the material into depressions of a moving conveyor for subsequent drying and removal.

3 Claims, 3 Drawing Figures

PROCESS FOR THE PRODUCTION OF CARBON DIOXIDE ABSORPTION AGENT PELLETS FOR USE IN RESPIRATORY EQUIPMENT

This is a division of application Ser. No. 892,038 filed Mar. 31, 1978.

BACKGROUND OF THE INVENTION

1. Field of the Invention

This invention relates to materials for use in respirators and, in particular, to a new and useful process for the production of a carbon dioxide absorption agent for use in respirators, and to an apparatus for carrying out the process, and also to a granular form carbon dioxide absorption agent produced therewith.

2. Description of the Prior Art

A carbon dioxide absorption agent for respirators and a process for its production are known, in which calcined lime is mixed with two to three times the quantity of water theoretically needed for slaking, so that a moist, compact mass is obtained. The mass is thoroughly kneaded and extruded in a known manner from dies to form filaments. The extrusions thus obtained, of a thickness of about 3 to 5 mm, are cut into pieces about 2 to 3 mm long and they are then dried. The extrusions can possibly be dried first and then cut. The drying temperature is between 50° and 70° C. The forming process is expensive and yet one does not achieve a defined form of the grains; during the necessary subsequent breaking a large amount of useless undersize grain is obtained. The $CO_2$ absorption is not very high, probably due to the fine-grain surface which forms in the dies. (Swiss Pat. No. 198,006).

A filling for air purification cartridges is known which consists of hollow-cylindrical binder substances to be poured in at random; these binder substances are pressed or molded bodies made from binder composition. During aspiration and absorption of carbon dioxide the hollow-cylindrical bodies lose their form. The lacking stability becomes the cause of increasing respiratory flow resistance. (German Pat. No. 392,031).

SUMMARY OF THE INVENTION

The invention provides a process for the production of a carbon dioxide absorption agent for use in respirator technology, whereby a high material utilization at greatly reduced property fluctuations is achieved and a form becomes possible which after filling into the vessel results in a low flow resistance. In addition the invention provides a device for carrying out the process and a carbon dioxide absorption agent made therewith in granular form.

The formed material has a strength (firmness) which will ensure shakeproof installation.

In accordace with the invention, lime is ground into fine particles and added continuously to water as it is moved through a slaking zone in order to slake the lime, and then moved continuously through a kneading zone in which it is kneaded to form a pasty mass. The pasty mass is then pressed into shaped depressions of a moving conveyor belt. The material in the depressions is moved through a dryer, to dry the material to form carbon dioxide absorption pellets. Thereafter the pellets are ejected from the depressions.

The advantages achieved with the process according to the invention, which are determined in very large measure by lime supplied in a state already ground with the slaking and kneading process occurring continuously, reside in an approximately 30% increase of the $CO_2$ absorption capacity as compared with the known material, and this at high material yield and low cost per working hour. The shaped bodies produced by this process have a high strength at an exceedingly porous surface, which ensure absorption down into the depth of the core of the shaped body. Due to the continuously occurring slaking, kneading, forming and drying process, the moisture content—important for the absorption—is well controllable. The same is true of the supply of chemical additions, such as the indicator.

The configuration of the shaped bodies, which can be achieved in a simple manner with the depressions in the revolving belt and also can be selected as to their form, permits the determination (fixation) of the data of the carbon dioxide absorption equipments, be it with respect to the absorption capacity, flow resistance, quantity filled, etc. This ensures the production of carbon dioxide absorption cartridges, for example, in always constant quality.

Accordingly, it is an object of the invention to provide an improved process for the production of carbon dioxide agent pellets for respirator equipment using a moving conveyor having a surface with shaped depressions therein, which comprises finely grinding lime and adding it to water while it is continuously moved through a slaking zone in which the lime is slaked, subsequently moving the slaked lime through a kneading zone in which the lime is continuously kneaded to form it into a pasty mass, and pressing the pasty mass into the shaped depressions on the moving conveyor, drying the material in the shaped depressions to form carbon dioxide absorption pellets, and subsequently ejecting the pellets from depressions.

A further object of the invention is to provide an apparatus for producing carbon dioxide absorption agent pellets which includes a twin screw conveyor with means for feeding granular calcined lime into the conveyor in a specific proportion with water as it is moved by the screw through a slaking section to effect the slaking thereof, the screws being further provided with a section in which the slaked lime is continuously kneaded to form it into a pasty mass, further including means at the location of the kneading and the slaking sections of the screw to regulate the temperature of the mass in these sections separately, with means for conveying off individual amounts of the material in shaped depressions on a conveyor disposed alongside the exit to the kneading section in a position to receive the mass therefrom, knifing means for spreading the mass into the depressions, and drying means for drying the mass into carbon dioxide absorption agent pellets.

A further object of the invention is to provide a carbon dioxide agent for respiration equipment in granular form comprising a shaped body comprising calcined lime slaked with water and kneaded and dried into a hemispherical pellet. A further object of the invention is to provide an apparatus for carrying out the method of the invention which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and

GENERAL DESCRIPTION OF THE PREFERRED EMBODIMENTS

Figure 1:
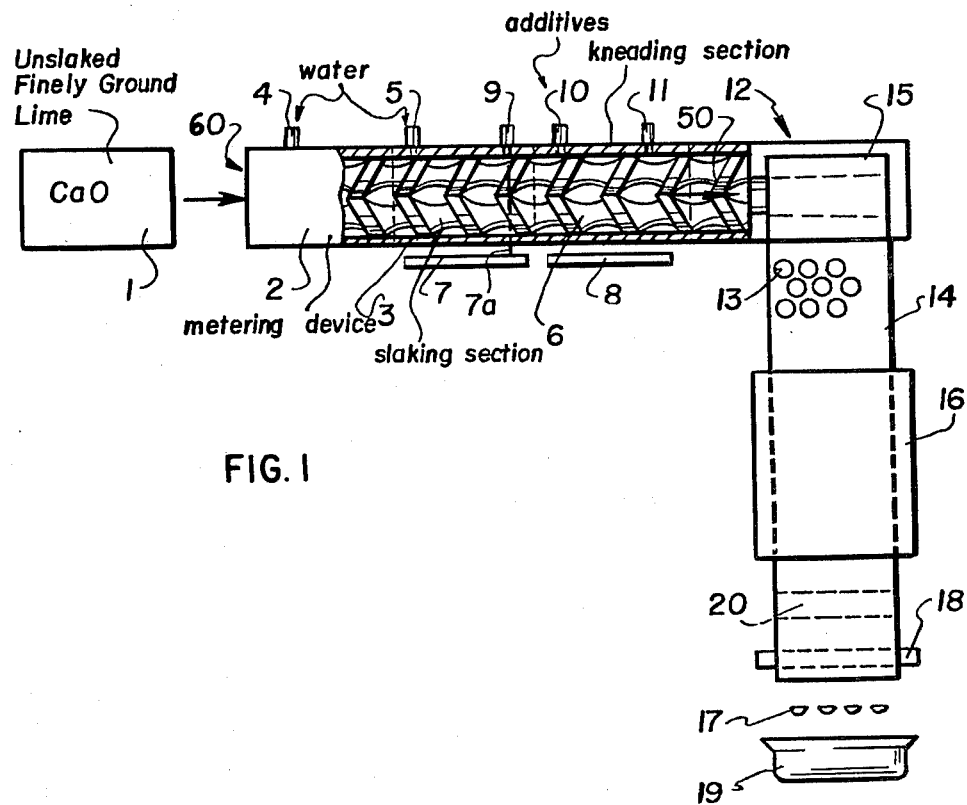
FIG. 1 is a schematic plan view of an apparatus for carrying out the process of the invention.
Figure 2:
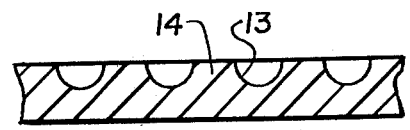
FIG. 2 is a partial cross sectional view of a conveyor belt to be used with the apparatus in FIG. 1.
Figure 3:
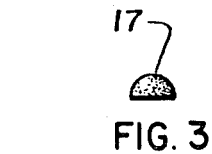
FIG. 3 is a sectional view of a carbon dioxide absorbing agent pellet formed by the invention.

Referring to the drawings in particular, the invention embodied therein comprises a process for the production of carbon dioxide absorbing agent pellets for respiratory equipment in which unslaked finely ground lime is added from a hopper 1 into a device generally designated 20 for metering, slaking, and kneading the materials and for passing them off in a pasty mixture to a knifing device generally designated 12 which includes means for applying the pasty mixture into depressions 13 of a moving conveyor 14.

Unslaked, finely ground lime 1 is continuously fed into a slaking section 3, after being metered as to volume via a metering device in section 2. The metered volume is simultaneously given a continuous addition of water. The water is also added, proportioned as to volume at a factor of 3.5 through water connections 4 and 5. The slaking section 3 and a following kneading section 6 include a twin screw conveyor driven directly through a clutch. The slaking section 3 has temperature control means 7, by which the reaction temperature of the mass is maintained over 60° C. and the kneading section 6 has the temperature control means 8, by which the temperature of the mass is maintained less than 80° C. The temperature control means 7 and 8 include means 7a of measuring the electric conductivity of the mass. The conductivity measuring means 7a is connected via the connection 9 at the exit of the slaking section 3 to a suitable power source.

Desired additions of chemicals, e.g. of an indicator, occur at the entrance of the kneading section 6 through a connection 10. Checking and control of the kneading process in the twin screw conveyor in kneading section 6 are effected by measuring the torque via the connection 11 at the exit of the kneading section 6 at the twin screw.

The fully kneaded mass is knifed into depressions 13 of a revolving belt 14 continuously through the knifing device 12. The depressions 13 to be filled are expanded by a dilating device 15 arranged below the belt 14. The kneaded mass is fed in the direction of arrow 50, and subsequently so as to be forced downwardly into the depressions. Belt 14 with the filled depressions 13 passes through the dryer 16 continuously. There the lime material is dried at about 60° C. The dry shaped bodies 17 in the form of hemishperes are pushed out of the depressions 13 by a rocker 18 applied on belt 14 and are collected in the vessel 19. A brush 20 overlies the conveyor belt 14 and cleans the depressions 13 before they are filled again in the knifing device 12.

What is claimed is:

1. A process for the production of carbon dioxide absorption agent pellets for respiratory equipment using a moving conveyor having a surface with shaped depressions therein, comprising finely grinding lime and adding water to it by continuously moving the water and lime through a slaking zone to slake the lime, continuously moving the slaked line through a kneading zone in which the lime is continuously kneaded to form it into a pasty mass, continuously pressing the pasty mass into the shaped depressions of the conveyor, drying the mass while it is in the depressions to form the mass into carbon dioxide absorption pellets, and ejecting the pellets from the conveyor depression conveyors.

2. A process according to claim 1, wherein the reaction temperature of the mass is maintained in the flaking zone over 60° C. and in the kneading zone less than 80° C.

3. A process according to claim 1, including measuring the electric conductivity of the mass and using the measurement to regulate the quantity of lime and water which is moved through the flaking and kneading zones.

* * * * *